Sept. 29, 1925.

W. SOUDER

DIMENSIONAL MEASURING DEVICE

Filed May 12, 1923

1,555,792

INVENTOR

Wilmer Souder

Patented Sept. 29, 1925.

1,555,792

UNITED STATES PATENT OFFICE.

WILMER SOUDER, OF SALEM, INDIANA.

DIMENSIONAL MEASURING DEVICE.

Application filed May 12, 1923. Serial No. 638,617.

(GRANTED UNDER THE ACT OF MARCH 3, 1883; 22 STAT. L. 625.)

*To all whom it may concern:*

Be it known that I, WILMER SOUDER, a citizen of the United States, and legal resident of Salem, county of Washington, State of Indiana, have invented certain new and useful Improvements in Dimensional Measuring Devices, of which the following is a specification.

The invention herein described may be used by the Government or any of its officers or employees, or by any other person in the United States, in the prosecution of work for the Government, without payment of any royalty thereon.

This invention is a dimensional measuring device designed more particularly for use in measuring dimensions of objects not readily adjustable between the calipering elements of an apparatus.

The device is especially adapted for the measurement of children, particularly infants, although it is to be understood that its uses are not limited to such measurements. In the treatment of some children's diseases, such for example as rickets, it may be desirous to ascertain accurately from time to time the measurements of the child to determine the progress of the disease. With young infants suffering from malnutrition it has been found difficult to accurately place them on a device in a definite position from which measurements are to be made from time to time for comparative purposes. Moreover, if the child is restless, accurate measurements from a fixed dimension limit or indicator are almost impossible, due to a lack of contact or of uniform pressure at the limit indicator, or to inaccuracy of placing the child on the support, as well as the time necessary to make the various preliminary adjustments prior to determining the final measurements.

A purpose of this invention is to provide means that will permit of uniform, definite and simultaneous adjustments whereby the necessary measurements may be quickly and accurately made without the necessity of placing the object to be measured at any definite or predetermined position upon the measuring apparatus.

A practical embodiment of the invention is illustrated in the accompanying drawings forming a part hereof, but it is to be understood that the structure therein shown does not define the limits of the invention, the scope of which is expressed in the appended claims.

In the drawings—

Figure 1:
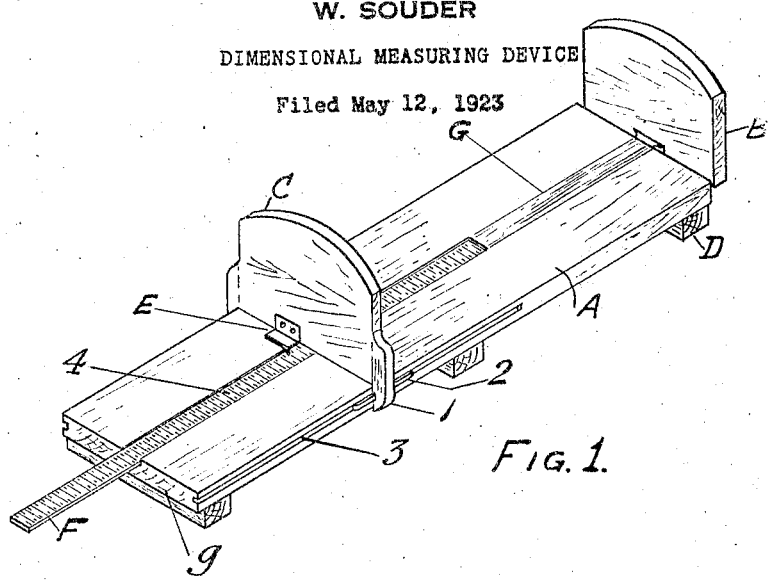
Figure 1 is a perspective view illustrating an embodiment of the invention designed for the measurement of infants.
Figure 2:
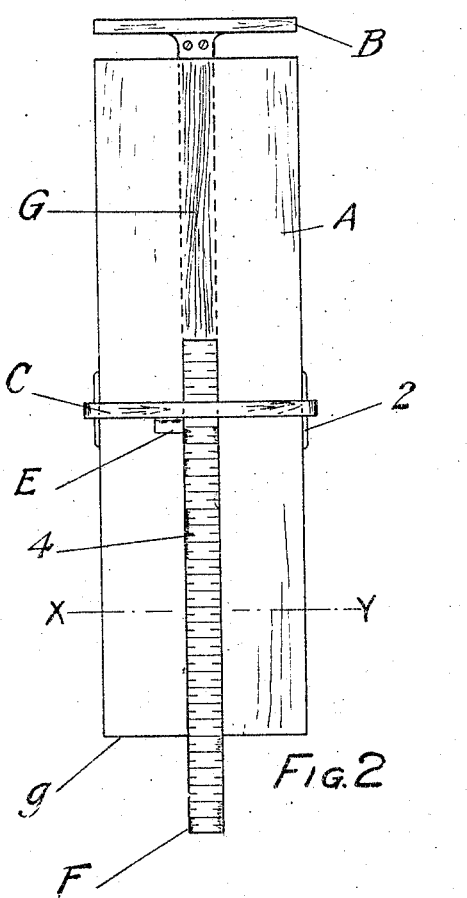
Figure 2 is a plan view of the device.
Figure 3:
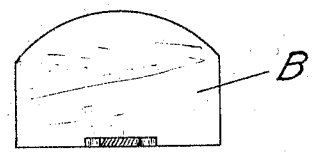
Figure 3 is a front elevation of one of the cooperating calipering elements which carries a portion of the measuring instrument.
Figure 4:
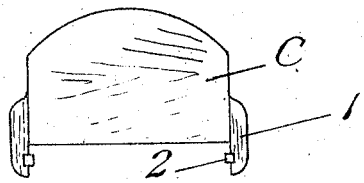
Figure 4 is a rear elevation of another of the calipering elements, the illustration omitting the indicator shown in Figure 1.
Figure 5:
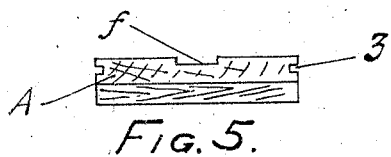
Figure 5 is a vertical sectional view on the line $x$—$y$ of Figure 2, with the measuring instrument removed.

The invention will be described more particularly with relation to a device for the measurement of infants, such as is illustrated in the accompanying drawings. In a device of this character a base or support A of any suitable material may be provided, and movably mounted relative to the support are a plurality of cooperating calipering elements B, C, which serve as movable limit indicators. The element B is preferably so mounted with relation to the base A that it has a limited or stop movement in contact with the head of the base member indicated at D. The movable element B is slidably mounted on the base A by means of the plate F fitting loosely in a kerf or longitudinal groove $f$ formed in the base A. This plate is preferably rigidly secured to the head element B and is preferably of greater length than the base A so that the plate extends beyond the foot $g$ of the base A to facilitate the operation of the head member B in a manner to be hereinafter described. The other calipering element C is shown provided with side extensions 1, which may be provided with an elongated rib 2 designed to slidably ride within a groove 3 of the base member A whereby the element C may be moved toward or from the cooperating element B.

Upon the upper face of the plate F may be printed, engraved or otherwise formed a scale 4, preferably in millimeters, to facilitate the measurement of the object to be placed between the elements B, C. The element C may be provided also with an indicator E of any desired form to cooperate with the scale 4 to facilitate the accurate dimensional readings of the object to be measured. The base member may be further provided with an inlaid section G to cover a portion of the plate member F and to thereby preclude frictional contact with the plate at the section of the base A designed to be used more particularly for receiving the object to be measured.

In operation the head element B is moved preferably away from the end D of the base A for a short distance, and the member C is moved toward the foot $g$ of the base member A. The infant may then be placed upon the base A at the section indicated by the inlay G so that the weight of the infant will not interfere with the free and easy movement of the scale plate F. It is therefore unnecessary to accurately place the infant upon any particular part of the base A, but it is preferable that the head of the infant shall be substantially coincident with the upper edge D or head of the base A. The child is placed in a reclining position and when that position has been assumed the operator will press the element C toward the feet of the child with one hand, and draw the head element B by means of the scale plate F, toward the head of the child, thereby obtaining quickly and accurately a definite measurement of the length of the child indicated upon the scale 4 by the indicator E. It will be observed that the calipering or cooperating elements B, C may be moved simultaneously by the two hands of the operator; that it is not necessary to place the infant to be measured at any definite position upon the base or supporting element A; that non-uniform pressure or lack of contact of one of the elements B or C, due to inaccuracy of the support, has been eliminated in a device of this character where both of the elements are movable toward the object to be measured. Where one of the elements, for example B, is fixed with relation to the base A, an unnoticed movement of the infant while adjusting the second element C causes an inaccurate measurement to be made, whereas with a device of the character herein described, and wherein both of the elements B and C are movable relative to the base and to the object placed upon the base, any movement of the infant will not vitiate the correct or accurate reading of the measuring device for the reason that both of the elements B and C are brought in contact with the infant substantially simultaneously by the operator and the reading can be quickly and accurately made at the time of such contact.

Having fully described my invention, what I claim is:

1. A measuring device comprising a base, a plate slidably mounted on the base and of substantially greater length than said base, a calipering element secured to one end of the plate and adapted to be moved toward or from an end of the base, the plate being provided with measuring indicia, and a second calipering element slidably mounted on the base and provided with an indicator adapted to cooperate with said indicia, whereby the length of an object placed upon the base and extending beyond one end thereof may be accurately measured by contact of said calipering elements against opposite ends of the object respectively.

2. A measuring device comprising a base, a plate slidably mounted on the base and of greater length than the base, to permit the plate to extend beyond the ends thereof, a calipering element secured to one end of the plate and adapted to be moved toward or from an end of the base, the movement of the calipering element being limited in one direction by its abutment against the end of the base, and a second calipering element slidably mounted on the base whereby the two elements may be simultaneously adjusted from one end of the base to determine the measurement of an object placed thereon, and wherein a portion of the object may extend beyond one end of the base.

3. A measuring device comprising a base, a plate slidably mounted on the base and of substantially greater length than the base, a calipering element secured to one end of the plate and adapted to be moved beyond an end of the base, and a second calipering element slidably mounted from the sides of the base and extending across the base over the plate, whereby the two calipering elements may be simultaneously moved from one end of the base into contact with an object placed on the base between the calipering elements.

WILMER SOUDER.